Aug. 13, 1940.  C. H. OSHEI  2,211,155
GEAR CASING VENTILATOR
Filed July 27, 1936
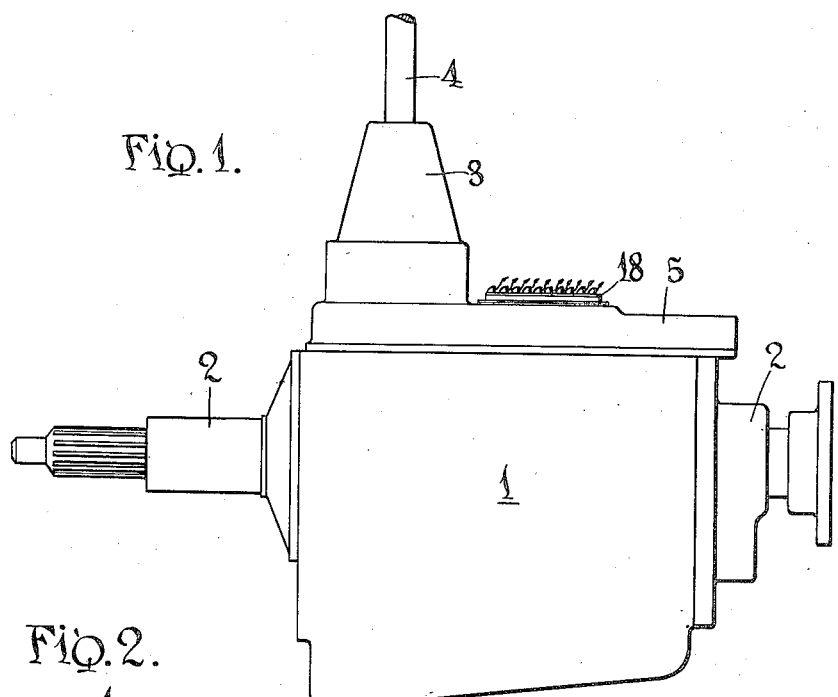
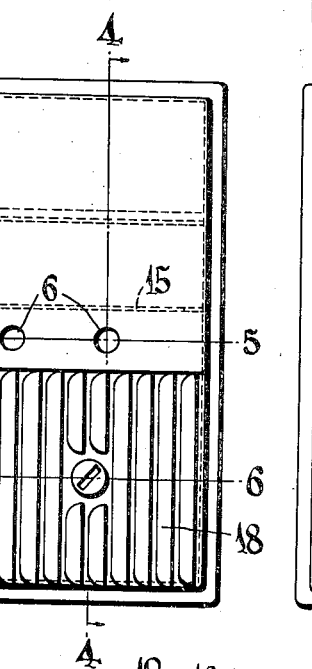
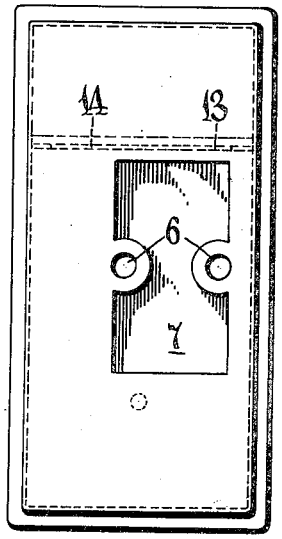
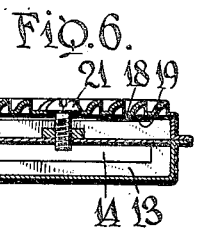
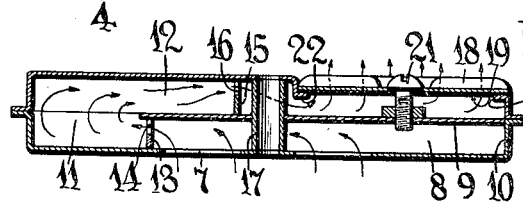
INVENTOR
Charles H. Oshei,
BY
Bean, Brooks, Buckley & Bean.
ATTORNEYS Patented Aug. 13, 1940

2,211,155

UNITED STATES PATENT OFFICE 2,211,155

GEAR CASING VENTILATOR

Charles H. Oshei, Detroit, Mich.

Application July 27, 1936, Serial No. 92,838

6 Claims. (Cl. 183—94)

This invention relates to a transmission ventilator for venting the speed changing transmission or other gear housing of a motor vehicle to the atmosphere, the object of the invention being to provide a practical structure which will permit the escape of generated air or gas pressure from the gear case without loss of the lubricant in which the gears normally operate.

In the present day construction of the motor vehicle oil is frequently found leaking out around the gear shift lever and shaft bearings in the speed changing transmission housing. This appears to be due to an internal gas or air pressure built up within the housing during gear operation.

Furthermore, it has been proposed in my earlier application for patent on a Motor vehicle, Serial No. 18,034, filed April 24, 1935, now Patent No. 2,105,259, Jan. 11, 1938, to convert an inclosed pair of intermeshing gears, in the power plant of a motor vehicle, into an air pump and thereby provide a reliable source of low-pressure for the operation of suction operated accessories. The adapted air pump thus provided draws air through the accessory and discharges or liberates it within the gear housing or case. Therefore, it is obvious that an internal pressure will rapidly build up within the gear housing and cause the lubricant to ooze or leak out wherever possible.

The present invention comprehends the provision of a ventilator construction which will permit the ready escape of air or gas from the gear housing without the lubricant, and so permit the gas pressure within the housing to remain more nearly that of the outside atmosphere whereby the leakage of oil is practically eliminated.

In the drawing which exemplifies one physical embodiment of the present invention Fig. 1 discloses the ventilator applied to a motor vehicle transmission housing;

Fig. 2 is a top plan view of the ventilator;

Fig. 3 is a bottom plan view thereof;

Fig. 4 is a longitudinal sectional view taken about on line 4—4 of Fig. 2; and

Figs. 5 and 6 are, respectively, transverse sectional views on lines 5—5 and 6—6 of Fig. 2.

Referring more particularly to the drawing, the numeral 1 designates a gear housing or case, and while the invention is applicable to a gear housing other than the speed changing gear housing, the latter has been illustrated as being more preferable as to volume or capacity and accessibility. The housing 1 is provided with the shaft bearings 2, fore and aft, and the lever bearing 3, through which latter extends the gear shift lever 4, all of which is conventional and of standard design. The cover 5 of the transmission housing is usually applied with a removable closure plate, not shown, the same being secured in position by a pair of screws.

The present invention, while applicable to other positions on the gear housing, is preferably designed for replacing such closure plate and to this end the ventilator is provided with a pair of screw holes 6 by which it may be attached in substitution for the displaced closure plate.

The ventilator is provided with a bottom opening 7 which may be co-extensive with the opening in the transmission cover 5 that is usually closed by the closure plate. The ventilator is hollow and contains a partition 9 that is spaced above the opening 7 to divide the interior into a lower or inner chamber 8 and an upper or outer chamber 12. This partition serves to deflect the outflow of air or gas, commingled more or less with oil from the gear case, and extends from one end wall 10 of the ventilator short of the opposite end wall to provide a communicating passage 11 between the lower and upper chambers. Adjacent the passage 11, and underlying the partition 9, is a restriction in the form of a transverse baffle 13 to hinder the outflow of the oil while permitting the escape of gas through an opening 14. A further restriction is provided in the upper chamber 12 by means of a transverse baffle 15 through which an opening 16 provides for the escape of air. The openings 14 and 16 are preferably disposed adjacent the top walls of their respective chambers for the better passage of the gas through the ventilator, and any oil which may collect in the passage 11 will form a gravity head which will be difficult to maintain without the return of the lubricant to the gear housing.

The partition 9 as well as the top and bottom walls of the ventilator may be given support by the tubes 17 which coincide with the screw holes 6 and serve to prevent the escape of oil around the attaching screws.

After the air passes through the opening 16 of the upper baffle it will find escape to the outside through the louvers in a removable panel 18, the louvers preferably opening toward the rear of the vehicle to better dissipate the fumes against passage into the passenger compartment of the car and further to induce an outflow of gas from the ventilator as the vehicle moves forwardly. A screen 19 immediately underlies the louvers for precluding the entrance of foreign matter into the gear chamber as well as to further obstruct the escape of oil from the ventilator. The panel 18 is detachably mounted over the atmospheric vent or opening 20 provided in a depressed portion of the top wall, the panel being secured in position by a screw 21 which finds anchorage in the partition 9, or a reinforced part thereof. The screen 19 is clamped in position on the marginal flanges 22, about the opening 20, by the panel so that the latter may be considered as a sectional part of the top wall.

In practice, the ventilator is attached to the cover 5 by passing the screws through the protected holes 6 and into threaded engagement with the cover. As the gases form within the gear housing, or as air may be discharged thereinto when the gears are adapted as pumping elements in accordance with the teachings of my prior application above referred to, the gaseous pressure will be relieved through the vent to the atmosphere as provided by the circuitous passage through the ventilator. Any oil or lubricant which may pass upwardly through the opening 7, either as a froth or which may be churned and splashed about it by the gears, will be baffled against free passage through the ventilator, being primarily obstructed by the lower baffle 13 and followed by the secondary obstruction 15 and again by the screen 19, which latter will be of universal design and of a gauge and mesh to be determined upon in accordance with the grade of transmission oil used.

The ventilator has been found to be effective in discharging the air without oil, and where it has been applied to cars in service, the leakage which had previously occurred around the gear shift lever and around the shaft bearings has been entirely corrected.

The ventilator, while preferably mounted over the usual opening in the cover section of the transmission housing, may be disposed in any other suitable location interiorly or exteriorly of the housing or any connected part thereof, such as the overdrive unit or the universal joint housing which form parts of the present day motor vehicle power plant. Likewise the ventilator could be placed upon the side of the housing, according to the dictates of the designer of the motor vehicle.

While the present invention has been described in detail, it is not the intention to restrict the same to the particular embodiment illustrated, since obviously the inventive principles herein involved are capable of other physical embodiments without departing from the scope or spirit of the invention.

I claim:

1. A ventilated speed changing transmission unit for being interposed in the drive line from the motor vehicle engine comprising in its entirety a closed lubricant-containing gear housing having driving and driven shafts journaled in and extending through the walls at the opposite sides thereof in a substantially fluid-tight seal therewith, a shiftable speed changing member mounted in the housing for varying the driving ratio between the two shafts, a shift lever journaled in a wall of the chamber in substantially fluid-tight seal therewith and connected to said speed changing member for shifting it, and pressure relieving means operable to retain the lubricant in the otherwise closed housing while ventilating the housing to generate gaseous pressure therein which would cause the lubricant to leak through the substantially fluid-tight seals.

2. A ventilated speed changing transmission unit for being interposed in the drive line from the motor vehicle engine, comprising in its entirety a closed lubricant-containing gear housing having driving and driven shafts journaled in and extending through the walls thereof in a substantially fluid-tight seal therewith, a shiftable speed changing member mounted in the housing for varying the driving ratio between the two shafts, a shift lever journaled in a wall of the chamber in substantially fluid-tight seal therewith and connected to said speed changing member for shifting it, a pressure relieving opening leading from said housing, and means associated with said opening for inducing a flow of air from said housing to continuously provide a substantially subatmospheric presure therein to prevent leakage of lubrican about the several shafts.

3. A ventilator for a transmission of a motor vehicle, comprising a substantially horizontal housing and a partition therein dividing the interior thereof into upper and lower chambers intercommunicating through an opening adjacent one end of the partition, and a baffle plate in each of said chambers extending transversely thereof and having a flow opening adjacent its upper edge whereby entrapped lubricant is retarded in its retrograde flow sufficient to insure liberation of entrained air before the oil flows back to the gear housing, the lower baffle underlying the partition and the upper chamber communicating with the atmosphere through an opening adjacent the opposite end of the partition, with the upper baffle being in supporting contact with the partition at a point between the openings.

4. A ventilator for transmissions of motor vehicles comprising a chambered body having a partition member for dividing said body into upper and lower chambers and horizontally offset openings in said lower chamber for establishing communication between said lower chamber and said gear housing and between said lower chamber and said upper chamber, said upper chamber having an opening offset horizontally from the opening of said chamber into the lower chamber, and means for inducing air flow from the upper chamber.

5. A ventilator for the transmission of a motor vehicle, comprising a chambered body having a partition member dividing said body into upper and lower chambers, said body having an opening establishing communication between said lower chamber and said transmission and a second opening offset horizontally from the first opening and establishing communication between said lower chamber and said upper chamber, tubular spacer means closed to the chambers and carried by the partition member in registry with openings in the walls of the body for receiving attaching means, and said upper chamber having an exhaust opening spaced from the second opening and provided with a cover plate having a restricted vent opening therein.

6. A ventilator for the transmission of a motor vehicle, comprising a chambered body having a partition member for dividing said body into upper and lower chambers and horizontally offset openings in said lower chamber for establishing communication between said lower chamber and said gear housing and between said lower chamber and said upper chamber, baffle plates in each of said chambers, an opening in said upper chamber offset horizontally from the opening of said chamber into the lower chamber, and a removable closure plate for the opening in said upper chamber provided with means responsive to forward motion of the motor vehicle for inducing a flow of air outwardly through said opening.

CHARLES H. OSHEI.